(12) United States Patent
Kim et al.

(10) Patent No.: US 10,581,120 B2
(45) Date of Patent: Mar. 3, 2020

(54) BATTERY PACK

(71) Applicant: SAMSUNG SDI CO., LTD., Yongin-si, Gyeonggi-do (KR)

(72) Inventors: Jae Min Kim, Yongin-si (KR); Dae Yon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 189 days.

(21) Appl. No.: 15/354,815

(22) Filed: Nov. 17, 2016

(65) Prior Publication Data
US 2017/0155172 A1    Jun. 1, 2017

(30) Foreign Application Priority Data
Dec. 1, 2015 (KR) .......................... 10-2015-016982

(51) Int. Cl.
*H01M 10/42* (2006.01)
*H01M 2/34* (2006.01)

(52) U.S. Cl.
CPC ............ *H01M 10/425* (2013.01); *H01M 2/34* (2013.01); *H01M 2200/00* (2013.01)

(58) Field of Classification Search
CPC ..... H01M 2/00–38; H01M 10/00–667; H01M 2200/00–30
USPC ......................... 429/1–11, 47–255
See application file for complete search history.

(56) References Cited

U.S. PATENT DOCUMENTS

| | | | |
|---|---|---|---|
| 2008/0187823 A1* | 8/2008 | Byun | H01M 10/0587 429/122 |
| 2010/0178534 A1* | 7/2010 | Lee | H01M 2/0404 429/7 |
| 2010/0203363 A1* | 8/2010 | Kwak | H01M 2/0473 429/7 |
| 2010/0216015 A1* | 8/2010 | Kamada | H01M 2/30 429/178 |
| 2011/0086244 A1 | 4/2011 | Baek et al. | |
| 2014/0322562 A1* | 10/2014 | Lee | H01M 10/425 429/7 |
| 2015/0004441 A1 | 1/2015 | Jeong et al. | |

FOREIGN PATENT DOCUMENTS

KR    10-2011-0038910 A    4/2011
KR    10-2013-0044821 A    5/2013

* cited by examiner

*Primary Examiner* — Bach T Dinh
(74) *Attorney, Agent, or Firm* — Lewis Roca Rothgerber Christie LLP

(57) ABSTRACT

A battery pack includes at least one battery cell; a protective circuit module mounted on a first surface of a battery cell of the at least one battery cell; and a top case covering a first end of the battery cell where the protective circuit module is mounted, and the protective circuit module includes a broad width area and a narrow width area, and an opening is formed on the top case corresponding to the broad width area of the protective circuit module.

14 Claims, 5 Drawing Sheets

BATTERY PACK

CROSS-REFERENCE TO RELATED APPLICATION

This application claims priority to and the benefit of Korean Patent Application No. 10-2015-0169982, filed on Dec. 1, 2015 in the Korean Intellectual Property Office, the entire content of which is incorporated herein by reference.

BACKGROUND

1. Field

Aspects of embodiments of the present invention relate to a battery pack.

2. Description of Related Art

Recently, as portable electronic devices become more miniaturized and lighter at a rapid pace, much studies are being conducted on secondary batteries that are widely used as the power source for driving such portable electronic devices. Such secondary batteries may be charged and discharged and used repeatedly, and are thus more economical than disposable batteries. Furthermore, secondary batteries may be miniaturized or mass-sized, and are being widely used in the field of high tech electronic devices due to high operating voltage and high energy density per unit weight.

In general, for electronic devices such as personal computers and mobile phones, electric vehicles and electric tools, it may be difficult to use only one battery cell as a power source. Therefore, a power element being adopted to such devices consists of a battery module having a plurality of battery cells connected in series and/or in parallel.

To such a battery module, a protective circuit module (PCM) such as a charging/discharging control circuit and/or protection circuit may be connected. At least one battery module to which such a PCM is connected is housed by an exterior case and forms a battery pack.

SUMMARY

According to an aspect of embodiments of the present invention, a battery pack has improved volume utilization due to an opening formed on a top case corresponding to a broad width area of a PCM arranged vertically to the longitudinal direction of a battery cell and on which a large component is mounted.

According to one or more embodiments of the present disclosure, a battery pack includes at least one battery cell; a protective circuit module (PCM) mounted on a first surface of a battery cell of the at least one battery cell; and a top case covering a first end of the battery cell where the protective circuit module is mounted, and the protective circuit module includes a broad width area and a narrow width area, and an opening is formed on the top case corresponding to the broad width area of the protective circuit module.

The PCM may be arranged such that a width direction of a circuit board of the PCM is vertical to a longitudinal direction of the battery cell.

An inner side of the top case and the narrow width area of the PCM may be spaced apart by a distance.

Both ends of the broad width area of the PCM may be exposed through the opening of the top case and positioned in the top case.

The battery pack may further include a label covering at least one side of the top case and at least one side of the battery cell.

The label may cover the opening of the top case.

The broad width area of the PCM and the label may be spaced apart by a distance.

A first gap G1 between the narrow width area of the PCM and an inner side of the top case may be smaller than a second gap G2 between the broad width area of the PCM and the label.

The protective circuit module may include a connector mounted on the broad width area, and the label may not cover the opening of the top case corresponding to the connector.

According to an aspect of embodiments of the present disclosure, by forming an opening on a top case corresponding to a broad width area of a PCM, it is possible to minimize or reduce the structure of the PCM and therefore reduce the material cost.

Furthermore, according to an aspect of embodiments of the present disclosure, a width dimension of the battery pack itself is reduced, thereby improving the degree of freedom of design.

BRIEF DESCRIPTION OF THE DRAWINGS

Some example embodiments will be described more fully hereinafter with reference to the accompanying drawings; however, they may be embodied in different forms and should not be construed as limited to the embodiments set forth herein. Rather, these embodiments are provided so that this disclosure will convey the scope of the present invention to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
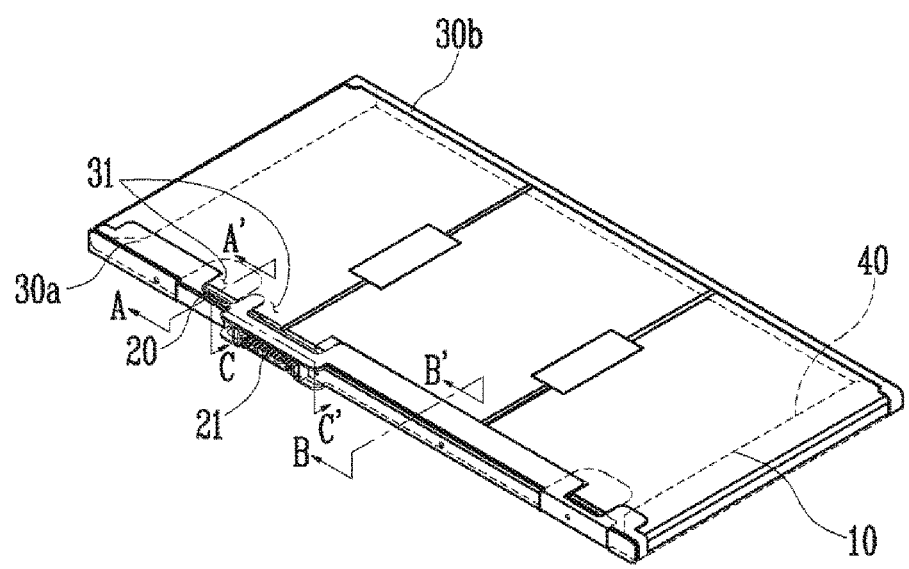
FIG. 1 is a perspective view of a battery pack according to an embodiment of the present disclosure.

Hereinafter, some exemplary embodiments of the present invention will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, may be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, "and/or" may include any one of or a combination of the components mentioned.

Furthermore, "connected/accessed" represents that one component is directly connected or accessed to another component or indirectly connected or accessed through another component.

In this specification, a singular form may include a plural form as long as it is not specifically mentioned otherwise. Furthermore, "include/comprise" or "including/comprising" used in this specification represents that one or more components, steps, operations, and/or elements exist or may be added.

Furthermore, unless defined otherwise, the terms used in this specification, including technical and scientific terms, have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, some exemplary embodiments of the present disclosure will be explained in further detail with reference to the drawings.

Figure 2:
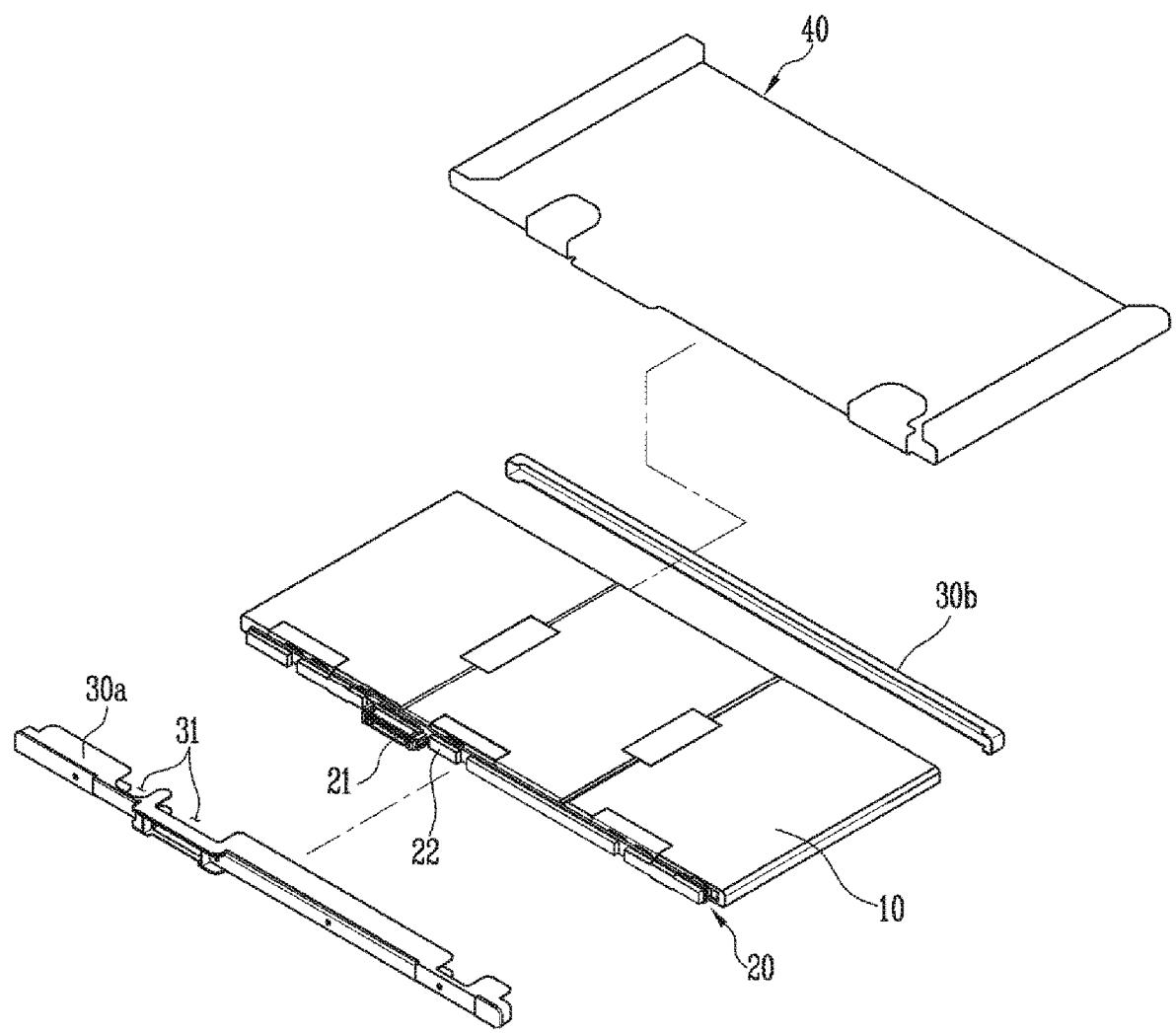
FIG. 2 is an exploded perspective view of the battery pack of FIG. 1.

FIG. 1 is a perspective view of a battery pack according to the present disclosure; and FIG. 2 is an exploded perspective view of the battery pack of FIG. 1.

Referring to FIGS. 1 and 2, a battery pack according to an embodiment of the present disclosure includes at least one battery cell 10, a PCM 20 mounted on an upper surface of the battery cell 10, and a top case 30a covering a top end of the battery cell 10 where the PCM 20 is mounted. The PCM 20 includes at least one broad width area 24 and at least one narrow width area 25. In an embodiment, on the top case 30a, an opening 31 is formed corresponding to the broad width area 24 of the PCM 20.

In an embodiment, the PCM 20 may consist of a protective circuit board where a circuit component is mounted and a secondary protective element connected to the protective circuit board. On the protective circuit board, a wire pattern is provided, and the circuit component may be formed in various sizes and be electrically connected to the wire pattern. In an embodiment, an area of the protective circuit board where a large circuit component is mounted is formed to have a broad width, and another area of the protective circuit board where a small circuit component is mounted is formed to have a smaller width.

According to an embodiment, in the PCM 20, the configuration that includes the broad width area 24 and the narrow width area 25 is the protective circuit board, but, hereinafter, for the sake of explanation, explanation will be made based on the PCM 20 including the broad width area 24 and the narrow width area 25.

In a general battery pack, a width of a protective circuit module forming a rectangular shape may be about 6 mm. Herein, if the thickness of the battery cell is less than 6 mm, there is a limitation to arranging the PCM in a vertical configuration, that is, arranging such that the longitudinal direction of the battery cell is vertical to the circuit board of the protective circuit module. In other words, since the width of the protective circuit module is greater than the thickness of the battery cell, it is difficult to realize a structure in which the top case surrounds the battery cell.

In a general battery pack, in a case in which the thickness of the battery cell is less than 6 mm, the longitudinal direction of the battery cell is arranged horizontal to the circuit board of the protective circuit module, which deteriorates or reduces the volume utilization of the battery pack.

A PCM may be inserted into a top case and then combined in a welding or soldering method. That is, the PCM is inserted into the top case, and then the PCM is connected to a top cap assembly in a welding or soldering method and combined on a battery cell, thereby manufacturing a battery pack.

According to embodiments of the present disclosure, the width of the PCM 20 varies depending on the size of the component being mounted on the PCM 20, and an opening 31 is formed (e.g., by removing) in the top case 30a corresponding to the broad width area 24 of the PCM 20. Accordingly, even if the width of the PCM 20 is formed to be greater than the thickness of the battery cell 10, the width direction of the circuit board of the PCM 20 may be arranged vertically to the longitudinal direction of the battery cell 10.

According to an embodiment, the battery pack of the present disclosure further includes a label 40, and the label 40 may be formed to cover at least one side of the top case 30a and the battery cell 10. In an embodiment, on at least one broad width area 24 of the PCM 20, a connector 21 is mounted, and on the opening 31 of the top case 30a corresponding to the area where the connector 21 is mounted, the label 40 may not be formed.

In order to improve the volume utilization of the battery pack, according to an embodiment of the present disclosure, the PCM 20 is arranged vertically to the longitudinal direction of the battery cell 10, and at least one area of the PCM 20 on which a large circuit component is mounted is formed to have a locally larger width. Furthermore, an opening 31 is formed on the top case 30a so as to accommodate the PCM 20 having a locally different width. Herein, the opening 31 may be covered by the label 40, whereby the PCM 20 is designed not to be exposed, thereby protecting the PCM 20.

Further description is provided below regarding configurations of the battery pack of the present disclosure.

As explained above, according to an embodiment of the present disclosure, a battery pack includes at least one battery cell 10, the PCM 20 mounted on an upper surface of the battery cell 10, and the top case 30a covering a top end of the battery cell 10 on which the PCM 20 is mounted. According to an embodiment of the present disclosure, a battery pack further includes a bottom case 30b that covers a lower end of the battery cell 10.

In an embodiment, the battery cell 10 may be formed in a pouch type, and accommodate an electrode assembly (not illustrated) inside thereof, and on the outside, an electrode terminal (not illustrated) may be exposed and be electrically connected to the PCM 20. Herein, the electrode assembly may include an anode plate, a separator, and a cathode plate laminated sequentially, and may be wound in a jelly roll shape and accommodated inside the battery cell 10.

The electrode terminal may include a first electrode terminal and a second electrode terminal, and the first electrode terminal may be exposed at one end of the battery cell 10. Furthermore, the first electrode terminal may be electrically connected to the cathode plate or the anode plate, and thus be electrically anode or cathode. The second electrode terminal may be exposed at one end of the battery cell 10, and be electrically connected to the anode plate or the cathode plate, and may have a polarity opposite to the first electrode terminal.

The PCM 20 may have a plurality of circuit components 22 including a charge/discharge control element and a switching element, and may open a circuit in the case of an overcharge or over-discharge so as to protect the battery pack. In an embodiment, the PCM 20 may further include the connector 21 for connection with an external device. In an embodiment, the PCM 20 includes at least one broad width area 24 (see FIG. 3) and at least one narrow width area 25 (see FIG. 3), such as according to a size of the circuit component 22 being mounted.

Although not illustrated in the drawings, a spacer (not illustrated) may be formed between each battery cell 10, and the spacer and the bottom case 30b may have configurations designed to withstand the compression that occurs when the PCM 20 is mounted on the upper part of the battery cell 10.

The top case 30a may cover the top end of the PCM 20 and the battery cell 10, and on an area of the top case 30a corresponding to the broad width area 24 of the PCM 20, the opening 31 is formed. The opening 31 may expose the broad width area 24 of the PCM 20.

Furthermore, the label 40 is formed on at least one side of the top case 30a and the battery cell 10, and the upper and lower part of the label 40 may be formed to cover the exterior of the top case 30a and the bottom case 30b, respectively.

Figure 3:
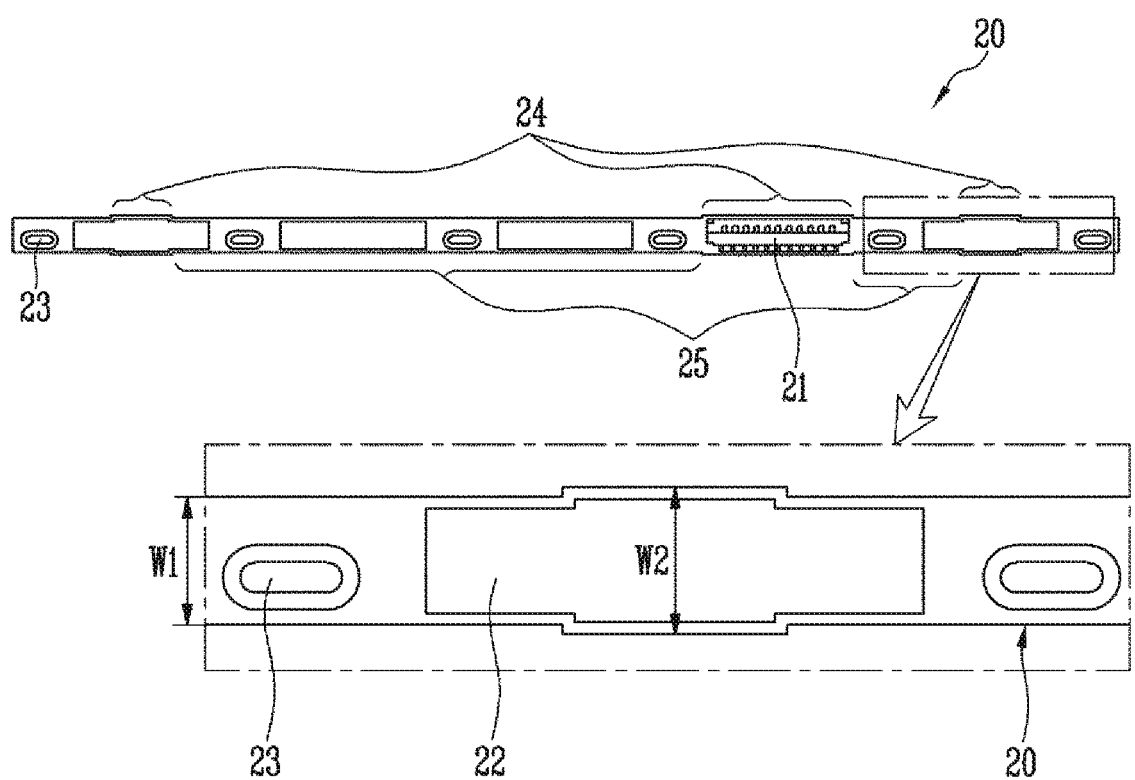
FIG. 3 is a front view of a PCM of a battery pack, according to an embodiment of the present disclosure.

FIG. 3 is a front view of the PCM 20, according to an embodiment of the present disclosure.

Referring to FIG. 3, the PCM 20 may include at least one broad width area 24 and at least one narrow width area 25. In an embodiment, an area, i.e. the broad width area 24, of the PCM 20 where a larger circuit component 22a (see FIG. 4) is mounted may be formed to have a broad width, and another area, i.e. the narrow width area 25, of the PCM 20 where a smaller circuit component 22b (see FIG. 5) is mounted may be formed to have a narrow width. In an embodiment, on the broad width area 24 of the PCM 20, the connector 21 may be mounted or formed.

The width of the PCM 20 corresponding to the narrow width area 25 is W1, and the width of the PCM 20 corresponding to the broad width area 24 is W2. In an embodiment, the width W1 of the narrow width area 25 may be 4.5 mm, and the width W2 of the broad width area 24 where the larger circuit component 22a is mounted may be 5.2 mm. Herein, the portion corresponding to the broad width area 24 may be open by the opening 31 of the top case 30a, and the opening 31 may be covered by the label 40 (see FIG. 4). This will be explained in further detail with reference to FIGS. 4 and 5.

In an embodiment, on an area of the PCM 20 where the circuit component 22 is not mounted, a connecting hole 23 may be formed with a distance (e.g., a predetermined distance). The connecting hole 23 may be an area where a lead (not illustrated) that electrically connects the battery cell 10 (see FIG. 1) and the PCM 20 is inserted to be solder-connected.

Figure 4:
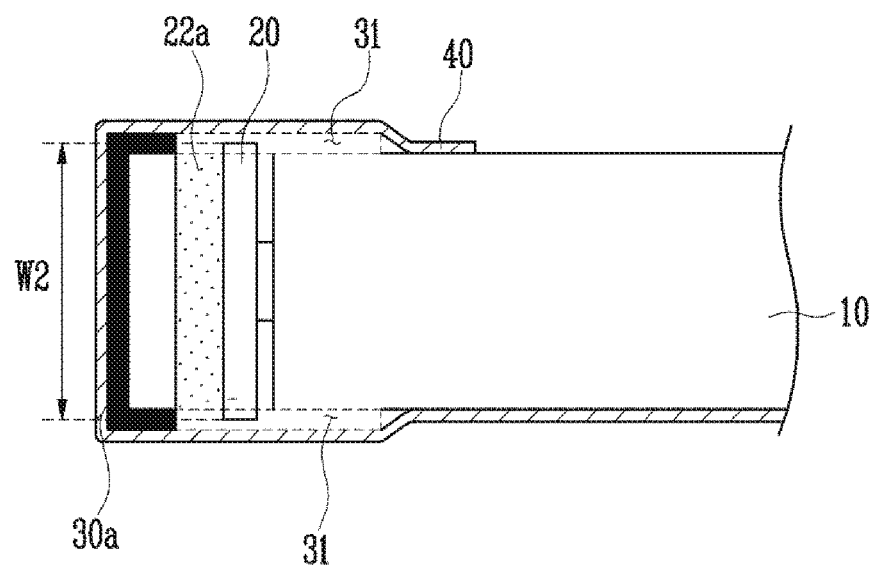
FIG. 4 is a cross-sectional view along the line A-A' of FIG. 1.
Figure 5:
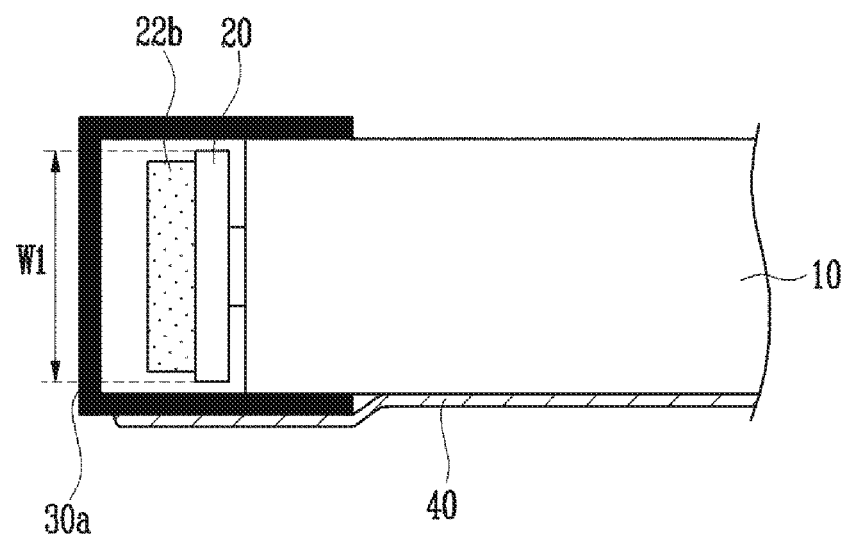
FIG. 5 is a cross-sectional view along the line B-B' of FIG. 1.

FIG. 4 is a cross-sectional view cut along the line A-A' of FIG. 1; and FIG. 5 is a cross-sectional view cut along the line B-B' of FIG. 1.

Referring to FIG. 4 and FIG. 5, the label 40 may cover at least one side of the top case 30a and the battery cell 10. The PCM 20 includes the broad width area 24 (see FIG. 3) where the larger circuit component 22a is mounted, and the narrow width area 25 (see FIG. 3) where the smaller circuit component 22b is mounted. In an embodiment, both ends of the broad width area 24 of the PCM 20 are exposed to the outside through the opening 31 of the top case 30a, but the opening 31 of the top case 30a may be covered by the label 40.

Referring to FIG. 4, both ends of the broad width area 24 of the PCM 20 may be positioned in the top case 30a, whereby the both ends of the broad width area 24 of the PCM 20 and the label 40 that covers the opening 31 may be spaced by a distance (e.g., a predetermined distance). In addition, as illustrated in FIG. 5, the inner side of the top case 30a and both ends of the narrow width area 25 (see FIG. 5) of the PCM 20 may be spaced by a distance (e.g., a predetermined distance).

Figure 6:
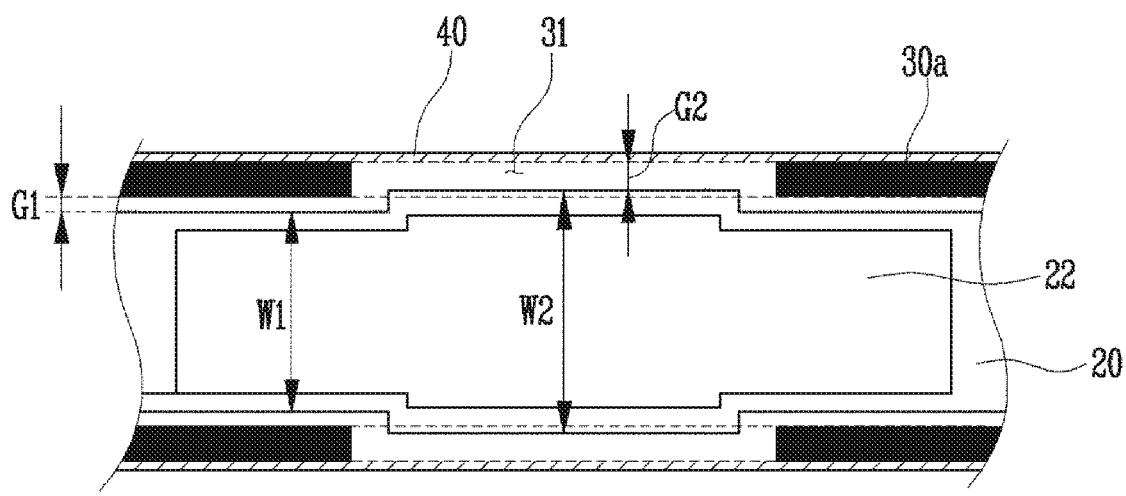
FIG. 6 is a cross-sectional view along the line C-C' of FIG. 1.

FIG. 6 is a cross-sectional view cut along the line C-C' of FIG. 1.

Referring to FIG. 6, a gap G1 between the narrow width area 25 of the PCM 20 and the inner side of the top case 30a may be smaller than a gap G2 between the broad width area 24 of the PCM and the label 40.

This is to minimize or reduce a shift or flow of the PCM 20 in a case of an impact occurring from outside, whereby the PCM 20 may shift or flow only as much as the gap G1 between the narrow width area 25 and the inner side of the top case 30a.

In a case where the gap G2 between the broad width area 24 of the PCM and the label 40 is greater than the gap G1 between the narrow width area 25 of the PCM 20 and the inner side of the top case 30a, if the PCM 20 shifts or flows, the label 40 may be damaged, thereby exposing the PCM 20 outside the label 40.

Some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and equivalents thereof.

What is claimed is:

1. A battery pack comprising:
   at least one battery cell;
   a protective circuit module mounted on a first surface of a battery cell of the at least one battery cell and comprising at least one circuit component;
   a top case covering a first end of the battery cell where the protective circuit module is mounted; and
   a label covering at least one side of the top case and at least one side of the battery cell,
   wherein the protective circuit module includes a broad width area having a width in a width direction and a narrow width area having a width in the width direction less than the width of the broad width area, a circuit component of the at least one circuit component is located at the broad width area, and an opening is formed on the top case corresponding to the broad width area of the protective circuit module, and
   wherein the opening is formed in an outer surface of the top case in the width direction, the opening extending from an edge of the outer surface along a longitudinal direction of the battery cell, the outer surface of the top case extending in the longitudinal direction over an outer surface of the battery cell, wherein the label covers the opening of the top case, wherein the broad width area of the protective circuit module and the label are spaced apart by a distance.

2. A battery pack comprising:

at least one battery cell;

a protective circuit module mounted on a first surface of a battery cell of the at least one battery cell;

a top case covering a first end of the battery cell where the protective circuit module is mounted; and a label covering at least one side of the top case and at least one side of the battery cell, wherein the protective circuit module includes a broad width area and a narrow width area, and an opening is formed on the top case corresponding to the broad width area of the protective circuit module, wherein a first gap between the narrow width area of the protective circuit module and an inner side of the top case is smaller than a second gap between the broad width area of the protective circuit module and the label.

3. The battery pack according to claim 2, wherein the protective circuit module comprises a connector mounted on the broad width area, and the label does not cover the opening of the top case corresponding to the connector.

4. The battery pack according to claim 2, wherein the at least one battery cell comprises a plurality of battery cells, the protective circuit module is mounted on a respective first surface of each of the plurality of battery cells, and the top case covers a respective first end of each of the plurality of battery cells.

5. The battery pack according to claim 2, wherein another circuit component of at least one circuit component of the protective circuit module is located at the narrow width area, the another circuit component having a width less than a width of a circuit component of the at least one circuit component that is located at the broad width area.

6. The battery pack according to claim 2, wherein the protective circuit module is arranged such that a width direction of a circuit board of the protective circuit module is vertical to a longitudinal direction of the battery cell.

7. The battery pack according to claim 2, wherein an inner side of the top case and the narrow width area of the protective circuit module are spaced apart by a distance.

8. The battery pack according to claim 2, wherein both ends of the broad width area of the protective circuit module are exposed through the opening of the top case and positioned in the top case.

9. The battery pack according to claim 2, wherein the label covers the opening of the top case.

10. The battery pack according to claim 2, wherein the broad width area of the protective circuit module and the label are spaced apart by a distance.

11. The battery pack according to claim 2, wherein the protective circuit module comprises a connector mounted on the broad width area, and the label does not cover the opening of the top case corresponding to the connector.

12. The battery pack according to claim 2, wherein the at least one battery cell comprises a plurality of battery cells, the protective circuit module is mounted on a respective first surface of each of the plurality of battery cells, and the top case covers a respective first end of each of the plurality of battery cells.

13. The battery pack according to claim 2, wherein an inner side of the top case and the narrow width area of the protective circuit module are spaced apart by a distance.

14. The battery pack according to claim 2, wherein both ends of the broad width area of the protective circuit module are exposed through the opening of the top case and positioned in the top case.

* * * * *